(12) United States Patent
Hehenberger (10) Patent No.: US 12,372,143 B2
(45) Date of Patent: Jul. 29, 2025

(54) POWER TRAIN

(71) Applicant: Gerald Hehenberger, Klagenfurt (AT)

(72) Inventor: Gerald Hehenberger, Klagenfurt (AT)

(73) Assignee: SET SUSTAINABLE ENERGY TECHNOLOGIES GMBH, Klagenfurt am Wörthersee (AT)

( * ) Notice: Subject to any disclaimer, the term of this patent is extended or adjusted under 35 U.S.C. 154(b) by 106 days.

(21) Appl. No.: 18/256,405

(22) PCT Filed: Dec. 20, 2021

(86) PCT No.: PCT/EP2021/086786
§ 371 (c)(1),
(2) Date: Jun. 7, 2023

(87) PCT Pub. No.: WO2022/129632
PCT Pub. Date: Jun. 23, 2022

(65) Prior Publication Data
US 2024/0117867 A1   Apr. 11, 2024

(30) Foreign Application Priority Data

Dec. 18, 2020   (AT) .............................. A 51115/2020

(51) Int. Cl.
*F16H 48/06*   (2006.01)
*F16C 19/38*   (2006.01)
(Continued)

(52) U.S. Cl.
CPC ....... *F16H 37/0806* (2013.01); *F16C 19/383* (2013.01); *F16H 3/72* (2013.01);
(Continued)

(58) Field of Classification Search
CPC ........ F16H 48/06; F16H 37/065; F16H 3/724; F16H 37/0806; F16H 3/75; F16H 3/727;
(Continued)

(56) References Cited

U.S. PATENT DOCUMENTS 4,774,855 A * 10/1988 Murrell ................... F03D 15/00
                                                           74/411
10,935,111 B2 * 3/2021 Lindenmaier ............. H02P 6/04
(Continued)

FOREIGN PATENT DOCUMENTS

AT          516038 A4     2/2016
CN       105443684 A     3/2016
(Continued)

OTHER PUBLICATIONS

International Search Report and Written Opinion of the ISA for PCT/EP2021/086786 mailed Mar. 23, 2022, 27 pages.
(Continued)

*Primary Examiner* — Roger L Pang
(74) *Attorney, Agent, or Firm* — NIXON & VANDERHYE (57) ABSTRACT

Disclosed is a drive train having a drive shaft of a driven machine, a drive machine, and a differential transmission with three drives or outputs, wherein one output can be connected to the drive shaft, a first drive can be connected to the drive machine, and a second drive can be connected to a differential drive. The differential drive is connected to the second drive via an adjusting gear system with gears, and the drive shaft is connected to the output via an output gear system with gears. Viewed from the drive machine in the direction of the axis of the drive shaft, the gears of the adjusting gear system project at least as far as into the area of the gears of the output gear system.

15 Claims, 5 Drawing Sheets

(51) Int. Cl.
*F16H 3/72* (2006.01)
*F16H 37/08* (2006.01)
*F16H 57/037* (2012.01)

(52) U.S. Cl.
CPC ........... *F16H 48/06* (2013.01); *F16H 57/037* (2013.01); *F16C 2326/06* (2013.01)

(58) Field of Classification Search
CPC ................. F16H 37/082; F16H 57/037; F16H 2200/2005; F16H 2200/2038; F16C 19/383
USPC ..................................... 475/225, 5, 207, 218
See application file for complete search history.

(56) References Cited

U.S. PATENT DOCUMENTS

| | | | | |
|---|---|---|---|---|
| 2009/0023529 | A1* | 1/2009 | Sanji | ...................... B60K 25/02 475/5 |
| 2015/0196923 | A1 | 7/2015 | Fornefeld et al. | |
| 2018/0126836 | A1 | 5/2018 | Waldner et al. | |
| 2021/0062900 | A1* | 3/2021 | Ore | ......................... F16H 3/728 |

FOREIGN PATENT DOCUMENTS

| | | |
|---|---|---|
| DE | 1259164 B | 1/1968 |
| DE | 3743382 A1 | 7/1989 |
| DE | 102015002585 A1 | 9/2016 |
| WO | 2016172742 A1 | 11/2016 |

OTHER PUBLICATIONS

Austrian Search Report for AT A 51115/2020 dated Jul. 14, 2021, 3 pages.

\* cited by examiner

POWER TRAIN

CROSS-REFERENCE TO RELATED APPLICATIONS

This application is filed as the US national stage of PCT/EP2021/086786, filed Dec. 20, 2021, which claims the priority of AT patent application A 51115/2020 filed on Dec. 18, 2020, the entirety of which is incorporated herein by reference.

BACKGROUND OF THE INVENTION

Field of the Invention

The invention relates to a drive train with a drive shaft of a driven machine, with a drive machine, and with a differential transmission with three drives or outputs, wherein one output can be connected to the drive shaft, a first drive can be connected to the drive machine, and a second drive can be connected to a differential drive, wherein the differential drive is connected to the second drive via an adjusting gear system, wherein the adjusting gear system has first gears, wherein the drive shaft is connected to the output via an output gear system, and wherein the output gear system has gears.

In addition, the invention relates to a drive train with a drive shaft of a driven machine, with a drive machine, and with a differential transmission with three drives or outputs, wherein one output can be connected to the drive shaft, a first drive can be connected to the drive machine via a gearbox drive shaft, and a second drive can be connected to a differential drive, wherein the differential drive is connected to the second drive via an adjusting gear system, wherein the adjusting gear system has gears, and wherein the gearbox drive shaft is mounted by means of a bearing.

Description of the Related Art

A drive-engineering requirement that is set, i.a., also during the course of an energy change, is a more efficient, speed-variable operation of driven machines or energy extraction installations. In addition, electric machines are used as examples for drive machines or generators, but the principle applies for all possible types of drive machines, such as, e.g., for internal combustion engines.

Drives that are used and available today of (a) driven machines, such as conveying systems, e.g., pumps, compressors, and fans, or such as mills, crushers, conveyor belts, motor vehicles, etc., and (b) generators, e.g., of energy extraction installations that are all encompassed according to the invention, are electric drive machines, such as, e.g., three-phase-asynchronous machines and three-phase-synchronous machines. In particular, in the case of greater drive capacity, however, the electric drive machine and a power network, to which the electric drive machine is attached, must be designed to be of corresponding size in order to be able to deliver a required input torque when starting from a speed equal to zero. For this reason, electric drive machines are therefore also to be attached instead directly to a network, often implemented in combination with a frequency converter as a speed-variable drive, or geared variable-speed couplings are also arranged between the electric drive and the driven machine. By comparison, an alternative that is more economical and better relative to efficiency is the use of differential systems, as they are known from, for example, WO 2016/172742 A1.

The core of a differential system is a differential transmission, which, in a simple embodiment, can be a simple planetary gearing stage (with a sun wheel, a planetary carrier with planet wheels mounted therein, and a ring gear) with three drives or outputs, wherein one output is connected to the drive shaft of a driven machine, a first drive is connected to a drive machine, and a second drive is connected to one or more differential drives. At a constant speed of the drive machine, the driven machine can thus be operated at variable speeds, wherein the differential drive makes possible a regulated, variable rpm of the drive shaft.

Additional exemplary variant embodiments of differential transmissions, which can also be used in this invention, are known from AT 516 038 A and DE 10 2015 002 585 A1.

In order to put a driven machine into operation from a dead stop and, in the case of an electric machine as a drive machine, additionally to bring a drive machine from a dead stop to preferably synchronous speed, the differential system can be implemented, e.g., according to WO 2016/172742 A1.

A basic way of looking at a problem is, however, that in many existing drive systems, only a relatively small installation space is available for retrofit measures (i.e., the replacement of a conventional drive, such as a simple gear system or a geared variable-speed coupling, by a differential system). Even in the case of new systems, however, a smaller installation space can pose a problem. In this case, the limiting dimensions are essentially, on the one hand, the overall length (the distance between the connector-side front sides of the pinion shaft of the drive machine and the drive shaft of the driven machine) and the axial offset (the axial offset between the pinion shaft of the drive machine and the drive shaft of the driven machine), and, on the other hand, the installation space taken up by the drive machine and the driven machine (including the periphery thereof).

SUMMARY OF THE INVENTION

The object of the invention is to find a solution with which it is possible to work with a small installation space of the differential system.

According to the invention, this object is achieved in a first embodiment of the invention by a drive train disclosed and claimed.

In an alternative embodiment of the invention, this object is achieved by a drive train also as disclosed and claimed.

Since parts of the drive train, viewed in the axial direction, are moved over one another, the overall length of the drive train can be shortened.

The overall length of the drive train can also be shortened in that the adjusting gear system has additional gears, in that the differential transmission has a bearing on a side facing away from the drive machine, and in that the additional gears of the adjusting gear system, viewed from the drive machine in the direction of the axis of the drive shaft, project at least as far as into the area of this bearing.

In order to make it possible to adapt the geometry of the drive train to the desired or necessary distance between the differential drive and the drive machine, it is provided in another preferred embodiment of the invention that the first and additional gears of the adjusting gear system are connected via a shaft, whose length is at least 150 mm×square root of the differential system-nominal power in MW, in particular at least 200 mm×square root of the differential system-nominal power in MW.

In this case, the shaft can be a shaft assembly that consists of at least two shaft sections that can be moved relative to one another, which makes possible a flexible adaptation.

If a bearing is arranged between the first drive of the differential transmission and the drive machine, which bearing is a roller bearing, in particular a two-row tapered roller bearing or a spherical roller bearing, the overall length can be further shortened in the case of higher precision of the mount.

Another possible measure to shorten the overall length is characterized in that the differential transmission has a ring gear with a ring gear carrier and planet wheels on a planetary carrier, in that the planetary carrier has a drive-machine-side bearing, and in that the ring gear carrier, viewed from the driven machine in the direction of the axis of the drive shaft, projects at least partially into the area of the drive-machine-side bearing.

Every single one of these measures is used to reduce the necessary installation space, wherein the combination of these measures results in a minimum installation space. It goes without saying that according to the invention, not all measures need be undertaken simultaneously; rather, it is also possible to implement only individual measures regardless of other measures.

Additional preferred embodiments of the invention are the subject matter of the other subclaims.

BRIEF DESCRIPTION OF THE DRAWINGS

Below, preferred embodiments of the invention are explained relative to the accompanying drawings. Here.

DETAILED DESCRIPTION

Figure 1:
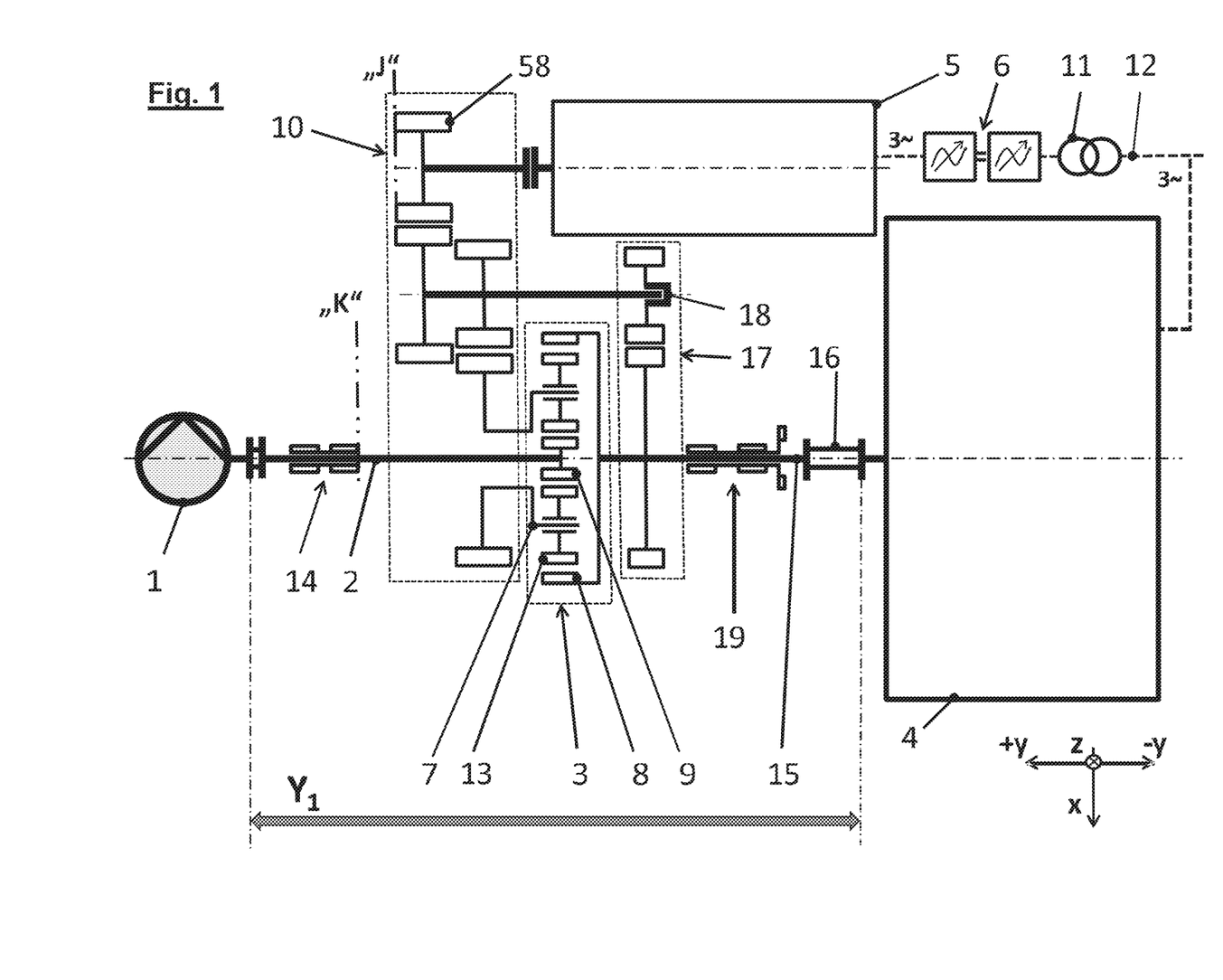
FIG. 1 shows the principle of a differential system for a drive of a pump according to the state of the art.

FIG. 1 shows the principle of a differential system for a drive train in the example of a pump. In this case, the driven machine 1 is a pump, which is indicated symbolically and is driven by a drive machine 4 via a drive shaft 2 and a differential stage 3. In the example shown, the drive machine 4 is a medium-voltage three-phase machine that is attached to a network 12, in this case a medium-voltage network. A sun wheel 9 of the differential stage 3 is connected to the drive shaft 2 mounted by means of, e.g., a friction bearing 14 (with, e.g., one or two radial bearings, and, if necessary, with an additional axial bearing), the drive machine 4 is connected to a ring gear 8, and a planetary carrier 7 (with one or more rotatable planet wheels 13 in the planetary carrier 7) is connected to a differential drive 5. The differential drive 5 is preferably a three-phase machine that is connected to the differential stage 3 via an adjusting gear system 10. As an alternative to the two-stage spur gear system that is shown, the adjusting gear system 10, for example, can also be a single-stage or multi-stage spur gear system (i.e., with or without stepped spur(s)) or implemented as a toothed belt drive or chain drive and/or implemented or combined with a planetary gearing stage and/or a bevel stage. With the adjusting gear system 10, moreover, an axial offset can be implemented in the x- and/or z-directions (cf. to this end the coordinate system) between the driven machine 1 or the drive machine 4 and the differential drive 5.

In this embodiment, the core of the differential system is thus a simple planetary gearing stage with three drives or outputs, wherein one output is connected to the drive shaft 2 or the driven machine 1, a first drive is connected to the drive machine 4, and a second drive is connected to the differential drive 5.

The following table shows combinations of the coupling of the planetary carrier, the sun wheel, and the ring gear with the driven machine [A], the differential drive [D], and the drive machine [M] that are possible and that are implemented according to the invention:

| Variant | 1 | 2 | 3 | 4 | 5 | 6 |
| --- | --- | --- | --- | --- | --- | --- |
| Sun wheel | D | A | M | D | M | A |
| Planetary carrier | M | M | A | A | D | D |
| Ring gear | A | D | D | M | A | M |

The differential drive 5 is linked electrically to the network 12 by means of preferably a low-voltage inverter 6 and—if necessary—a transformer 11. The equalization between a variable rotor rpm of the drive shaft 2 and a set rpm of the grid-bound drive machine 4 is provided by the speed-variable differential drive 5. Multiple differential drives 5, which drive the second drive in parallel or alternately, can also be connected to the second drive of the differential system. The positioning or the distribution in the differential system of one or more differential drives 5 is variable in both the x- and z-directions.

The drive train depicted horizontally in FIG. 1 to FIG. 4 can also in principle be oriented vertically. This applies in general for all possible variants of differential systems.

The overall length Y1 defines the distance between the connector-side front sides of a drive shaft of the driven machine 1 and a pinion shaft of the drive machine 4. In order to avoid a collision between the drive machine 4 and the differential drive 5, the differential system can be implemented to be correspondingly long in the direction of the axis of the drive machine 4 or (as depicted) a correspondingly long coupling 16 can be incorporated. For this reason, it is also easy to accommodate a friction bearing 19 of the gearbox drive shaft 15, implemented to be relatively long (with, e.g., one axial bearing and two radial bearings).

In principle, an input gear system between differential stage 3 and drive machine 4 is possible, and thus in addition to adapting the rpm, a horizontal and/or vertical adaptation of the overall length and/or axial offset can be implemented. In this case, the input gear system can be, for example, a single-stage or multi-stage spur gear system or can be implemented as a toothed belt or chain drive and/or can be implemented or combined with a planetary gearing stage and/or a bevel stage.

In order to make it possible to run up the driven machine 1 from a speed equal to zero, the differential system is equipped with a superimposing drive 17. For running up the system, the gearbox drive shaft 15 is connected to the differential drive 5 by means of the superimposing drive 17, a detachable/adjustable coupling 18, and the adjusting gear system 10. The differential drive 5 can thus run up the driven machine 1 with closed coupling 18 and at the same time synchronize the drive machine 4 with the network 12.

The above-described properties and features of the differential system according to the state of the art are also applicable for the differential systems described below, if they are not replaced or supplemented by other or additional features.

Figure 2:
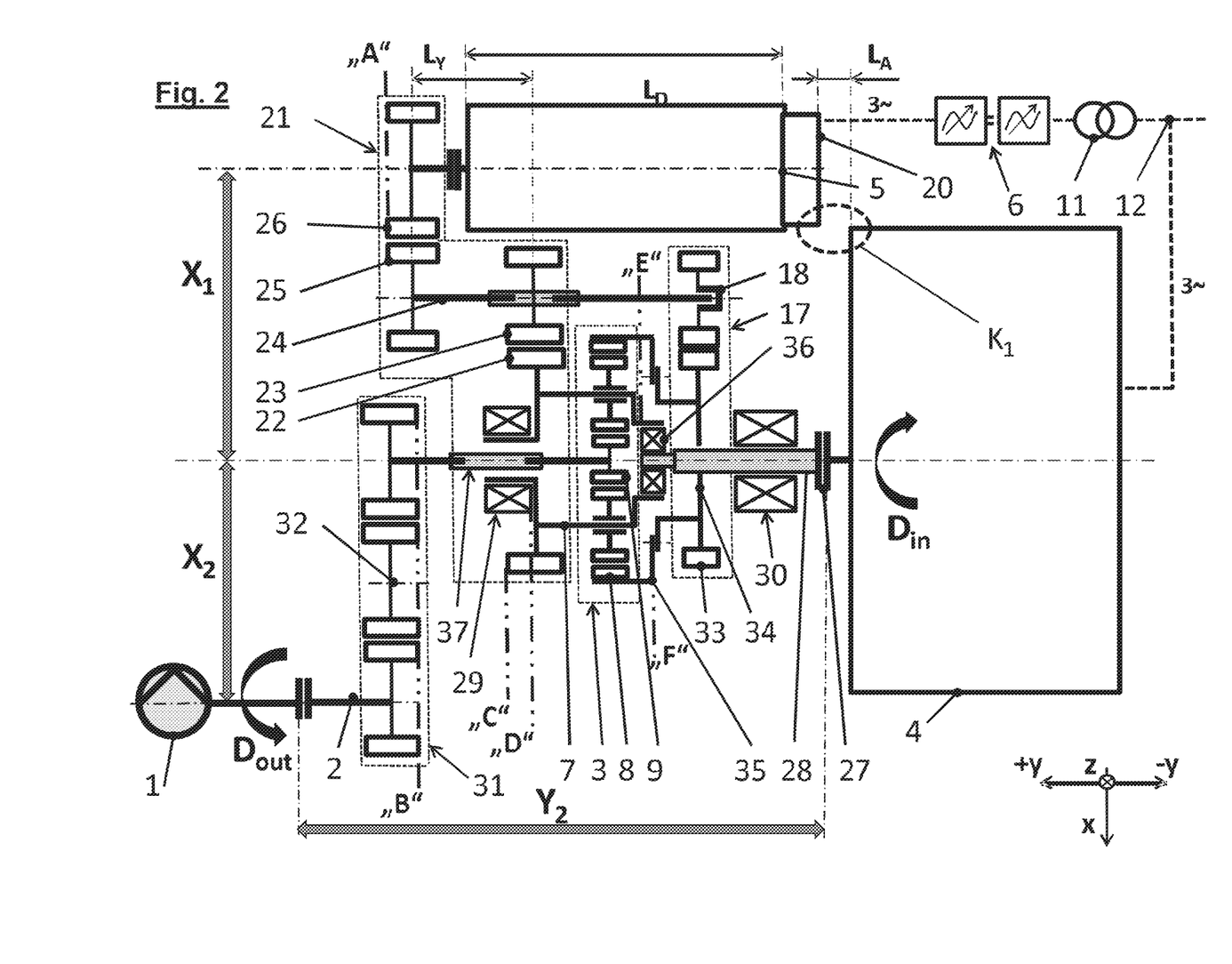
FIG. 2 shows a first embodiment, according to the invention, of a differential system.

FIG. 2 shows an embodiment, according to the invention, of a differential system. The driven machine 1 is also driven here by a drive machine 4 via a drive shaft 2 and a differential stage 3 (consisting of sun wheel 9, ring gear 8, and planetary carrier 7 with one or more rotatable planet wheels). If it is not possible or not desirable to provide any larger axial distances for a differential drive 5 in the x- and/or z-directions, this is essentially a matter of finding an approach with which a collision between the differential drive 5 (or optionally multiple differential drives) and the drive machine 4 can be avoided, wherein the collision area in FIG. 2 is drawn in as collision area K1 by way of example. In this area, e.g., for maintenance and repair purposes, a minimum distance LA should be maintained in order to be able to (dis)assemble, e.g., parts of the differential system easily and without great additional expense with the differential system in the assembled state. The measurement for LA depends on the incorporated parts, the system size (e.g., power, design standards (ISO, API, etc.) to be applied), and the environmental and installation conditions of the differential system.

An overall length LD of the differential drive 5 is derived from the requirements of the system design. Here, by designing the system in an especially precise manner, an attempt is preferably made to use correspondingly small differential drives 5 (relative to both overall length and diameter). This improvement is achieved by means of small design measures, such as electric drives with, e.g., water jacket cooling with or without external water-air heat exchangers or permanent magnet-excited three-phase machines, which tend to be used in the selection of the differential drive 5. In contrast, special operating points, such as, e.g., an "operating speed" of the differential drive 5 equal to zero, under certain circumstances require a forced ventilation unit 20, i.e., a separately driven cooling system corresponding to the state of the art. The above-mentioned variant embodiments are available as standard in addition to many other variant embodiments, but the latter require a correspondingly varying overall length LD.

In order to be able to adapt the speed range of the system, an output gear system 31 (consisting of gears including the mount thereof) can be implemented between the sun wheel 9 and the driven machine 1. As an alternative to the embodiment shown with an idle wheel 32, the output gear system 31 can also be, for example, a single- or multi-stage spur gear system (with or without stepped spur gears) or implemented as toothed belts or chain drives and/or implemented or combined with a planetary gearing stage and/or a bevel gear stage. With the output gear system 31, moreover, an axial offset can be implemented in the x- and/or z-directions between the driven machine 1 and the differential drive 5. In the embodiment shown, the direction of rotation in the drive system is changed, i.e., the direction of rotation Din of the gearbox drive shaft 28 and the direction of rotation Dout of the drive shaft 2 are opposite. If, for example, the idle wheel 32 is eliminated, the directions of rotation Din and Dout would be identical. Thus, by means of a corresponding configuration of the output gear system 31 in addition to the axial offset in the z- and x-directions, the direction of rotation of the drive shaft 2 can also be varied.

The axial offset X2 is the axial distance in the x-direction between the drive shaft 2 and a gearbox drive shaft 28. Any required axial offset between the drive shaft 2 and the gearbox drive shaft 28 in the z-direction is also possible, but is not depicted in FIG. 2.

The output gear system 31 or the drive shaft 2 (if no output gear system 31 is present) is connected to the sun wheel 7, e.g., by means of a symbolically depicted sun shaft bond 37. The sun shaft bond 37 is designed, for example, in multiple parts with, e.g., one or more shaft-hub connections (e.g., alignment gearing according to DIN 5480), but can also be in one part and is mounted according to the selected shaft bond and generally applicable construction standard. Moreover, a suitable coupling can also be integrated in the sun shaft bond 37.

As in FIG. 1, the differential system is also equipped here with a superimposition path. The speed ratio of the superimposing drive 17 is preferably configured in such a way that the drive machine 4 achieves at least approximately its synchronous speed as soon as a lower speed in the so-called differential mode is set on the driven machine 1. After or while the drive machine 4 was or is connected to the network, the coupling 18 is opened, and the differential system then operates in differential mode.

For the described running-up method, in principle, the speed range for which the system is designed in differential mode does not matter. This is to be adapted accordingly only to the speed ratio of the adjusting gear system 17.

In addition to the differential mode, the servo mode is any mode in which the differential system is run up and in this case is operated in a speed range below the differential mode. In principle, the differential system can also be operated permanently in this mode with rpm-specific full or reduced power of the driven machine 1.

In order to keep the torque to be overcome on the driven machine 1 as low as possible during (i) the running-up phase in the servo mode (in the case of, e.g., small speed range in the differential mode) and (ii) optionally also in the differential mode, for example a valve, bypass, or hydraulic short-circuit in the working-medium circuit (e.g., water- or air- or gas circuit) of the driven machine 1 and their upstream or downstream systems/installations can be provided and, i.a., can also be actuated during the start process.

The coupling 18 is switchable or preferably freewheeling, or is a synchronizing coupling, as described in, for example, WO 2016172742 A1. The coupling 18 is supplied preferably continuously or at intervals with oil depending upon lubrication, cooling, and function, wherein this oil supply is preferably a part of the lubricating and cooling system of the differential system.

Both in differential mode and in servo mode, the differential drive 5 preferably operates in its standard speed range. The standard speed range is the speed range in which the differential drive 5 operates, in order to be able to implement the operational speed range of the driven machine 1. The standard speed range is in this case determined primarily by manufacturer-specified voltage, current, and speed limits that are dependent upon an operating time.

As an alternative to the depicted solution of the superimposition path (consisting of the superimposing drive 17, coupling 18, and gear 23), a detachable/adjustable connection between the two drives of the differential system or between the output and one of the drives of the differential system can also be provided by means of a separate gear that is connected to, e.g., the planetary carrier gear 22.

In the embodiment shown, the differential system consists of a differential stage 3, one or more differential drive(s) 5, an output gear system 31, a superimposing gear 17, and an adjusting gear system 21.

The differential drive 5 (in the depicted embodiment, for example, with fitted-on forced ventilation unit 20) is connected to the differential stage 3 via the adjusting gear system 21 according to the invention. The adjusting gear system 21 consists of a planetary carrier gear 22 (preferably helical-cut or herringbone-cut), a gear 23, and a servo stage, consisting of a gear 25 and a gear 26. The gear 23 is connected by means of a shaft assembly 24 to the gear 25. Corresponding to the desired/necessary distance LA between the differential drive 5 and the drive machine 4 or the desired overall length Y2, the overall length of the shaft assembly 24 is specified LY (medium distance between the gears 23 and 25 in the y-direction, i.e., in the direction of the axis of the drive shaft 2).

The adjusting gear system 21 can be implemented with
  (a) One or more additional gearing stages in the form of a single- or multi-stage spur gear system (i.e., with or without stepped spur gears) or
  (b) A toothed belt or chain drive, and/or implemented or combined with
  (c) A planetary gearing stage, and/or
  (d) A bevel gear.

Any required axial offset between the drive shaft of the differential drive 5 and the gearbox drive shaft 28 in the z-direction is also possible, but is not depicted in FIG. 2.

By adaptation of LY, e.g., based on the overall length LD of the differential drive 5 depending on design and implementation (plus an optionally-integrated forced ventilation unit 20), a project-specific required overall length Y2 of the differential system can be implemented. The overall length Y2 is the distance between the connector-side front sides of a drive shaft of the driven machine 1 and a pinion shaft of the drive machine 4.

The shaft assembly 24 is, for example, in two parts with, e.g., a symbolically depicted shaft-hub connection (e.g., alignment gearing according to DIN 5480), but can also be in one part or more than two parts. The gears 23 and 25 are mounted separately, together, or combined corresponding to the selected shaft assembly 24. In the depicted embodiment, for example, the gear 23 is also connected to the superimposing drive 17 by means of a symbolically depicted shaft-hub connection.

According to the invention, the length LY is preferably selected in such a way that the servo stage 25, 26 projects at least partially as far as into the area of the output gear system 31 in the y-direction, viewed from the drive machine 4 in the direction of the axis of the drive shaft 2. In this connection, "projecting into the area" means that a plane "A," which is on the driven-machine-side front side of the gear 26, is arranged in the positive y-direction (+y) behind a plane "B," which is on the drive-machine-side front side of the respective gears of the output gear system 31. In other words, the plane "A" has a greater distance from the drive machine 4 or the coupling 27 than the plane "B."

In a preferred embodiment, LY is at least 150 mm×square root of the differential system-nominal power in MW and, in an especially preferred variant, at least 200 mm×square root of the differential system-nominal power in MW.

In this connection, the following sample calculation: in a differential system with a nominal power of 9 MW, LY has a length of at least 450 mm and, in an especially preferred variant, a length of at least 600 mm.

The planetary carrier 7 with the associated planetary carrier gear 22 is mounted by means of a bearing 29 on the driven-machine side. This bearing 29 is preferably a spherical roller bearing or a cylindrical roller bearing with preferably the smallest possible radial play. In order to implement a shortest possible overall length Y2, the planetary carrier gear 22 according to the invention projects at least partially in the y-direction, viewed from the drive machine 4 in the direction of the axis of the drive shaft 2, as far as into the area of the bearing 29.

In this connection, "projecting into the area" means that a plane "C," which is on the driven-machine-side front side of the planetary carrier gear 22, is arranged in the positive y-direction (+y) behind a plane "D," which is on the drive-machine-side front side of the bearing 29. In other words, the plane "C" has a greater distance from the drive machine 4 or the coupling 27 than the plane "D."

As a bearing 30 of the gearbox drive shaft 28, preferably not a friction bearing, which is used almost exclusively in power plants or in the oil and gas industry, but rather a roller bearing, preferably a two-row tapered roller bearing, is used in a so-called O-arrangement. In this case, a gear housing is designed in such a way that it is possible to alternate between a roller bearing and a friction bearing by means of, e.g., a separate add-on part.

Another measure, according to the invention, for reducing the overall length Y2 consists in implementing a drive-shaft-side gear 33 of the superimposing drive 17 in combination (i.e., in one part or in multiple parts with a positive- or non-positive-locking connection of the components) with a connecting flange 34. The connecting flange 34 is in this case the connecting element between a single-part or multi-part ring gear carrier 35 and the gearbox drive shaft 28. The connecting flange 34 and the gearbox drive shaft 28 are implemented in one or more parts (e.g., connected in a non-positive-locking manner).

Preferably, the connecting flange 34 is connected to the ring gear carrier 35 by means of a positive- and/or non-positive-locking connection, and in turn, the ring gear carrier 35 is connected to the ring gear 8 by means of a positive- and/or non-positive-locking connection.

The combination of ring gear 8, ring gear carrier 35, connecting flange 34, and gearbox drive shaft 28 can be implemented alternatively in one to three parts or more than four parts.

The planetary carrier 7 is mounted on the drive-machine side by means of a bearing 36 (preferably in the form of a cylindrical roller bearing with the smallest possible radial play). In order to implement a shortest possible overall length Y2, according to the invention, the ring gear carrier 35 projects at least partially in the y-direction, viewed from the driven machine 1 in the direction of the axis of the drive shaft 2, into the area of the bearing 36. In this connection, "projecting into the area" means that a plane "F," which is on the drive-machine-side front side of the ring gear carrier 35, is arranged in the negative y-direction (−y) behind a plane "E," which is on the driven-machine-side front side of the bearing 36. In other words, the plane "F" has a greater distance from the driven machine 1 than the plane "E."

Because of the implementation of the differential system according to the invention, a coupling 27 can be implemented especially as a short part to be a connecting element between the gearbox drive shaft 28 and the pinion shaft of the drive machine 4, and thus the overall length Y2 can be reduced.

As an alternative or as regards the situation depicted in FIG. 2 (avoiding a potential collision K1), there is also the option to lengthen the axial distance X1 between differential drive 5 and drive machine 4 and/or the coupling 27 instead of or in combination with an adaptation of LY. These measures would, however, give rise to higher costs.

Any necessary vertical axial offset in the Z-direction (vertical axial distance between the gearbox drive shaft 28 and the differential drive 5) can also be implemented with the adjusting gear system 21, but is not depicted in FIG. 2.

Figure 3:
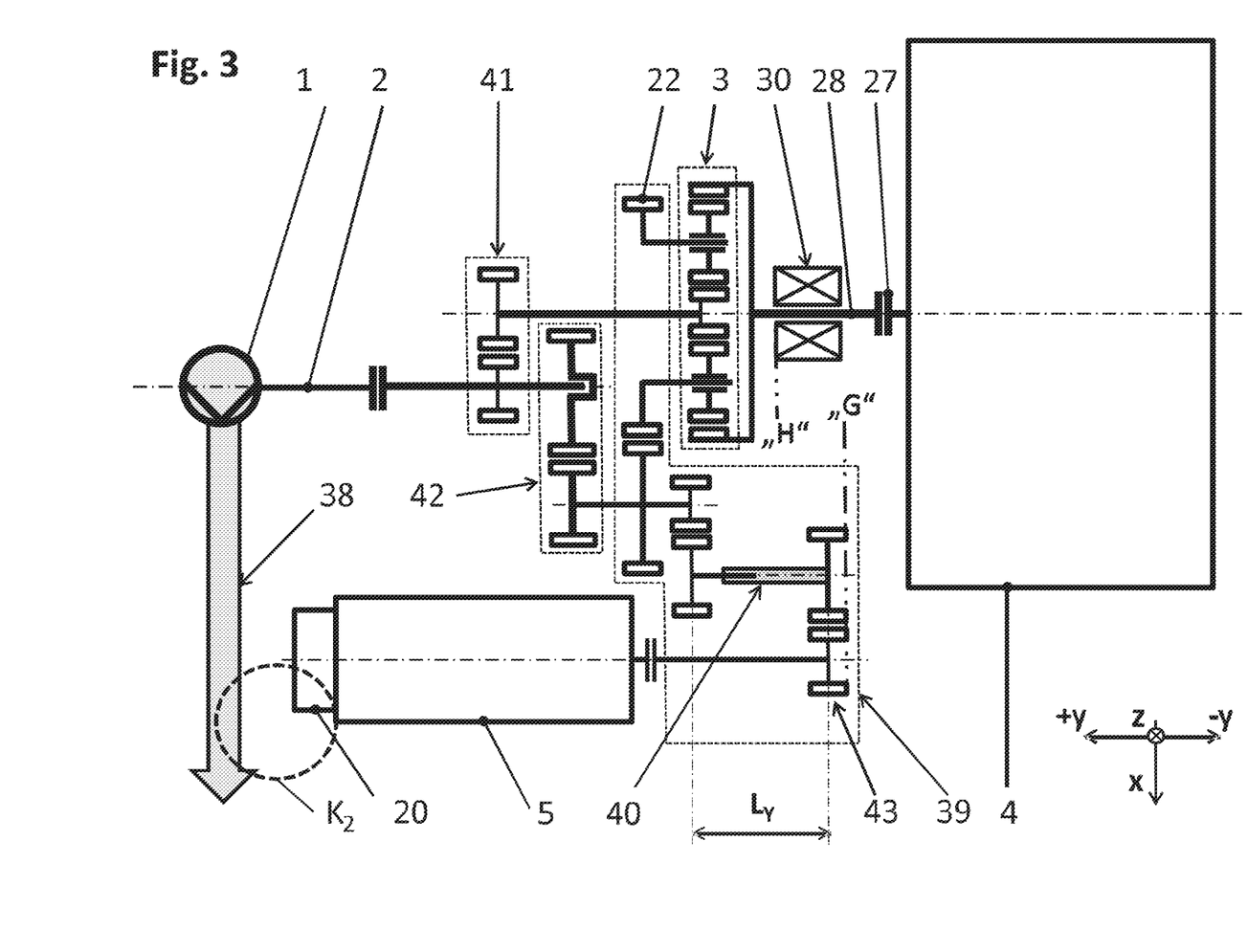
FIG. 3 shows another embodiment, according to the invention, of a differential system.

FIG. 3 shows another embodiment, according to the invention, of a differential system. The driven machine 1 is also driven here by the drive machine 4 via the drive shaft 2 and the differential stage 3 (consisting of the sun wheel, ring gear, and planetary carrier with one or more rotatable planet wheels). The differential drive 5 including optional forced ventilation unit 20 is rotated by 180 degrees relative to the arrangement according to FIG. 2. In order to avoid a collision in the area K2 between the differential drive 5 or the forced ventilation unit 20 and the driven machine 1 including their periphery 38 (e.g., pipes, installations, infrastructure, etc.), the position of an adjusting gear system 39 including a shaft assembly 40 is also rotated accordingly. Relative to the configuration, the same applies for the shaft assembly 40 as for the shaft assembly 24. The length LY is preferably selected so that a servo stage 43 (as part of the adjusting gear system 39) projects at least partially into the area of the bearing 30 of the gearbox drive shaft 28 in the negative y-direction (−y), viewed from the driven machine 1 in the direction of the axis of the drive shaft 2. In this connection, "projecting into the area" means that a plane "G," which is on the drive-machine-side front side of at least one of the respective servo stage-gears 43, is arranged in the negative y-direction (−y) behind a plane "H," which is on the driven-machine-side front side of the bearing 30. In other words, the plane "G" has a greater distance from the driven machine 1 than the plane "H."

In this embodiment, an output gear system 41 is in one stage and can be connected to the adjusting gear system 39 or to the differential drive 5 by means of a superimposing drive 42. Thus, the differential system can be run up accordingly, as already described in FIG. 2.

Figure 4:
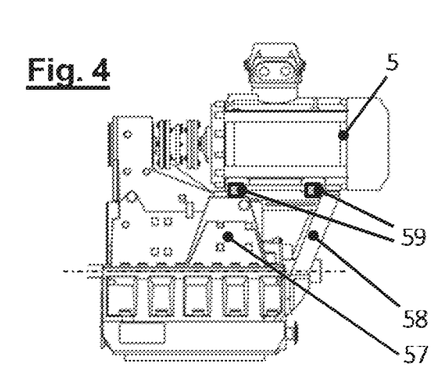
FIG. 4 shows still another embodiment, according to the invention, of a differential system.

FIG. 4 shows another embodiment, according to the invention, of a differential system. As already described above, in the case of retrofit measures (i.e., replacement of a conventional drive, such as a simple gear system or a geared variable-speed coupling, by a differential system), in most cases only a limited installation space is available—this in particular in connection with the machine base. In order to avoid the cost of rebuilding here, i.a., the differential drive(s) 5 is/are positioned on a gear housing 57 according to the invention. Moreover, in a variant embodiment, the non-drive-side bases of the differential drive(s) 5 are mounted on the gear housing 57 by means of a frame 58. According to the invention, the differential drive(s) 5 is/are decoupled from the gear housing 57 and the frame 58 by means of decoupling elements 59. This can be done by using, e.g., elastomer bearings. Elastomer bearings are machine elements that consist of rubber-metal connections, which reduce oscillations that arise on machine parts and gently mount add-on parts. The service life of the machines (in this case, differential drive 5) can be increased, and simultaneously-occurring solid-borne sound can be lessened.

If necessary, a screw connection of the gear housing 57, preferably a die-cast housing, is to be adapted to project-specific conditions with a base (socket). This is done by means of, e.g., a modular die-cast-mold-and-die set of the gear housing 57, by virtue of the fact that the attachment of different mold elements, adapted to a variable screwing pattern, is done on a core element of the die-cast mold. As an alternative, a separate intermediate frame can be inserted between the gear housing 57 and the base socket.

Figure 5:
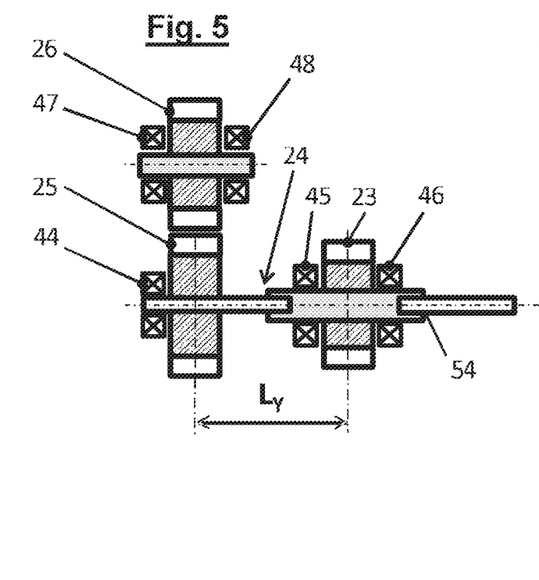
FIG. 5 shows an embodiment, according to the invention, of a shaft assembly.

FIG. 5 shows an embodiment, according to the invention, of a shaft assembly 24. In the depicted variant embodiment, according to the invention, the shaft of the gear 25, on the one hand, is mounted by means of a bearing 44, and on the side facing the gear 23, it is mounted on the shaft of the gear 23 via, for example, a positive-locking shaft-hub connection of the shaft assembly 24. The gear 25 can thus be decoupled from the gear 23 of the adjusting gear system 21 in the axial direction. The shaft of the gear 23 is mounted by means of bearings 45 and 46. The shaft of the gear 26 is mounted by means of bearings 47 and 48. Optionally, the shaft assembly 24 can be expanded by means of another, e.g., positive-locking shaft-hub connection 54, and thus a connection can be created on the superimposing drive 17.

According to the invention, in general, alternative variants of a mount or shaft connection according to the state of the art can be used.

According to the invention, the length LY is selected so that the servo stage 25, 26 including the bearing 44 or bearing 47 thereof in the y-direction, viewed from the drive machine 4 in the direction of the axis of the drive shaft 2,
  a) At least partially projects over the bearing 14 in the case of a differential system without an output gear system (e.g., according to FIG. 1), and
  b) At least partially projects over the output gear system 31 in the case of a differential system with an output gear system (e.g., according to FIG. 2).

In this connection according to FIG. 1, "partially projects over" means that a reference line "J" (this is the reference line that [sic] through the driven-machine-side front side of the gear 58) is in the positive y-direction (+y) behind a reference line "K" (this is the reference line that goes through a drive-machine-side front side of the bearing 14).

Figure 6:
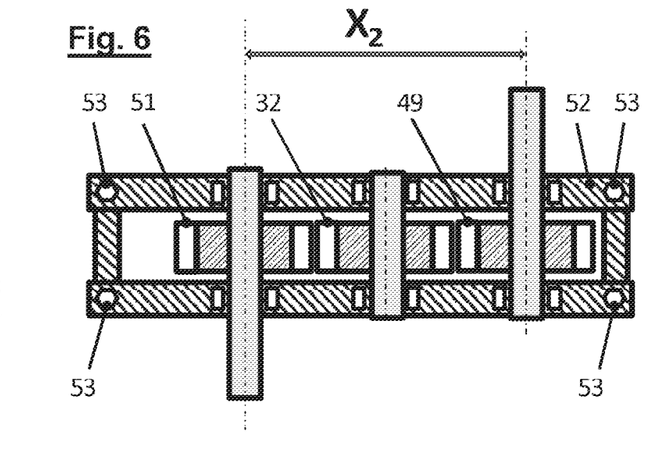
FIG. 6 shows an embodiment, according to the invention, of an output gear system, according to FIG. 2.

FIG. 6 shows an embodiment, according to the invention, of an output gear system based on the description of the output gear system 31 according to FIG. 2. The output gear system 31 in this case consists of preferably herringbone-cut gear shafts 49, 32, and 51 plus their mounts (radial and optionally axial), which are preferably implemented as friction bearings, but also roller bearings or magnetic bearings can be used in principle.

The shaft of the gear 49 is connected to the sun shaft bond 37, and the shaft of the gear 51 is connected to the drive shaft 2. The shafts of the gears 49, 32, and 51 and their mounts are preferably accommodated in a modifiable frame 52, i.e., adjustably adapted to the respective requirements. Preferably, the frame 52 is a welded structure, which can be easily adapted to the project-specific requirements, such as, e.g.,
  a) Change in the direction of rotation $D_{out}$ and thus elimination of the idle wheel 32,
  b) Rpm of the drive shaft 2,
  c) Horizontal axial distance X2,
  d) Vertical axial distance between gearbox drive shaft 28 and drive shaft 2,
  e) Tilting of the bearing shells, etc.

As an alternative, the frame 52 can also be implemented as a die-cast structure.

The frame 52 is connected (e.g., screwed) to the gear housing 57 of the differential system, implemented preferably as a die-cast structure.

Lubricating-oil lines for lubricating gears and mounts are preferably also integrated in the frame 52.

Based on the described embodiment, preferably
a) Screw connections 53 between frame 52 and gear housing 57,
b) The connections between the lubricating-oil lines of the gear housing 57 and the lubricating-oil lines of the frame 52, and
c) Subsequently the die-cast form of the gear housing can thus remain unchanged regardless of the configuration of the output gear system 31.

Figure 7:
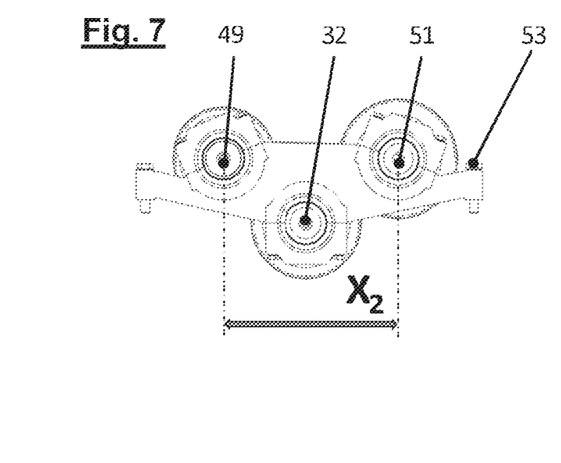
FIG. 7 shows another configuration, according to the invention, of an output gear system.

FIG. 7 shows another configuration, according to the invention, of an output gear system 31 according to FIG. 2. Relative to the example in FIG. 6, this embodiment is implemented with a smaller horizontal axial offset X2 and tilting of the bearing shells.

The described embodiments of the invention according to FIGS. 6 and 7 can also be used in isolation from the invention in question and thus represent a separate invention and the possibility of adapting the differential system economically to the project-specific requirements.

Figure 8:
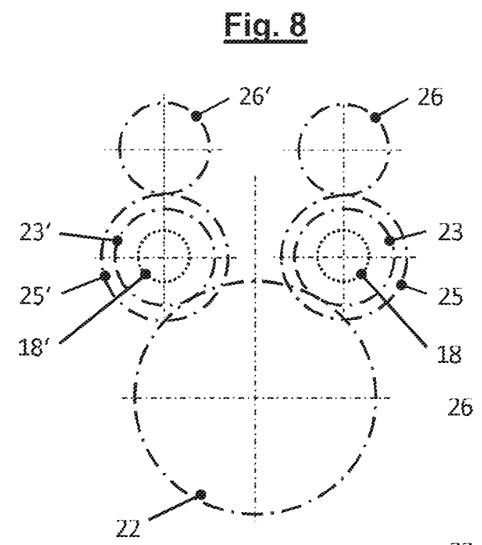
FIG. 8 shows a configuration, according to the invention, of an adjusting gear system.

FIG. 8 shows an embodiment, according to the invention, of a configuration of an adjusting gear system. In addition to the gearing stage depicted in FIG. 2, consisting of the gears 23, 25, and 26, a second gearing stage, consisting of the gears 23', 25', and 26', is implemented as another adjusting gear system to form another differential drive. Moreover, in this variant embodiment, the superimposition path is also implemented twofold alternatively (as a variant) with another detachable/adjustable coupling 18'.

A speed ratio of the gearing stage with the gears 25 and 26 can be different from the gearing stage with the gears 25' and 26', in order thus to be able to integrate, e.g., differential drives with different numbers of pole pairs. The same applies for the gear pairings
gears 22 and 23 or 22 and 23',
gears 23 and 25 or 23' and 25', and
gears 22 and 17 or 22 and 17'.

In this case, the speed ratios of the superimposition path must then optionally be adapted accordingly.

Figure 9:
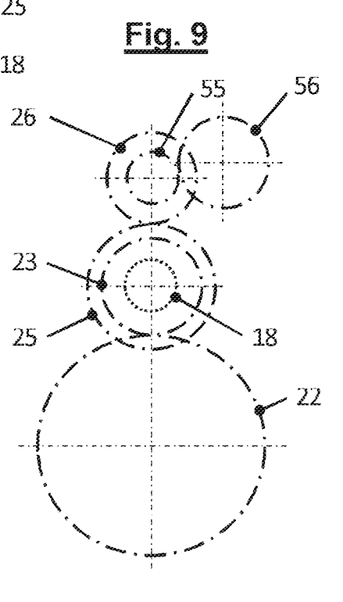
FIG. 9 shows another configuration, according to the invention, of an adjusting gear system.

FIG. 9 shows another configuration, according to the invention, of an adjusting gear system. In addition to the servo stage depicted in FIG. 2, consisting of the gears 25 and 26, here another servo stage, consisting of the gears 55 and 56, is implemented.

Figure 10:
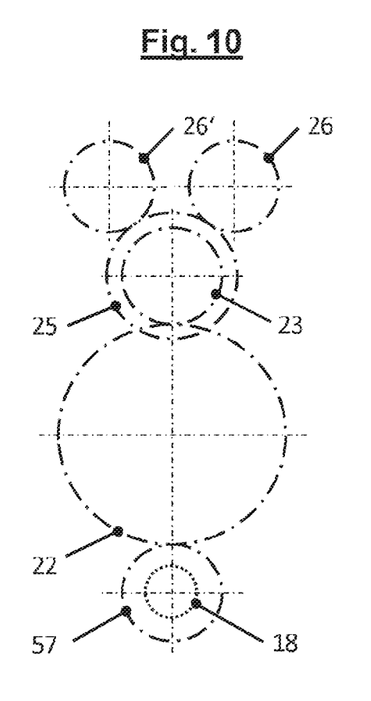
FIG. 10 shows still another configuration, according to the invention, of an adjusting gear system.

FIG. 10 shows another configuration, according to the invention, of an adjusting gear system. In this embodiment, a gear 26' is implemented for attaching another differential drive 5 as an expansion of the adjusting gear system 21. The speed ratio of the gears 25 and 26 can be different from the speed ratio of the gears 25 and 26' in order to thus be able to integrate, e.g., differential drives with different numbers of pole pairs. The attaching of the planetary carrier gear 22 to a superimposing drive and the coupling 18 is implemented in this embodiment by means of a separate gearing stage, consisting of the planetary carrier gear 22 and gear 57.

In the depictions according to FIGS. 8 to 10, the positioning of the gears, the couplings, and the differential drives is in the x- and z-directions, or their distribution is variable over the periphery of the planetary carrier gear 22.

Moreover, the described embodiments of the invention according to FIGS. 8 to 10 can also be used in isolation from the invention in question and thus represent a separate invention and the possibility of adapting the differential system economically to the project-specific requirements.

The invention claimed is:

1. A drive train comprising:
a drive shaft of a driven machine;
a drive machine; and
a differential transmission with three drives or outputs,
wherein one of the three drives or outputs is configured to be connectable to the drive shaft, a first drive of the three drives or outputs is configured to be connectable to the drive machine, and a second drive of the three drives or outputs is configured to be connectable to a differential drive,
wherein the differential drive is connected to the second drive via an adjusting gear system comprising first gears,
wherein the drive shaft is connected to the output via an output gear system comprising gears, and
wherein at least one of the first gears of the adjusting gear system has a driven-machine-side front side that passes through a plane "A" perpendicular to an axis of the drive shaft, wherein one of the gears of the output gear system has a drive-machine-side front side that passes through a plane "B" perpendicular to the axis of the drive shaft, a distance from the plane "A" to the drive machine being greater than a distance from the plane "B" to the drive machine,
wherein the differential transmission comprises a ring gear with a ring gear carrier and planet wheels on a planetary carrier, the planetary carrier comprising a drive-machine-side bearing, and
wherein the ring gear carrier has a drive-machine-side front side that passes through a plane "F" perpendicular to the axis of the drive shaft, wherein the drive-machine-side bearing has a driven-machine-side front side that passes through a plane "E" perpendicular to the axis of the drive shaft, a distance from the plane "F" to the driven machine being greater than a distance from the plane "E" to the driven machine.

2. The drive train according to claim 1, wherein the adjusting gear system comprises additional gears that have a driven-machine-side front side that passes through a plane "C" perpendicular to the axis of the drive shaft, wherein the differential transmission comprises a bearing on a side facing away from the drive machine that has a drive-machine-side front side that passes through a plane "D" perpendicular to the axis of the drive shaft, and wherein a distance from the plane "C" to the drive machine is greater than a distance from the plane "D" to the drive machine.

3. The drive train according to claim 2, wherein the first gears and additional gears of the adjusting gear system are connected by means of a shaft, whose length is at least 150 mm×square root of the differential system-nominal power in MW.

4. The drive train according to claim 3, wherein the shaft is a shaft assembly, which consists of at least two shaft sections, which can be moved relative to one another.

5. The drive train according to claim 1, wherein a roller bearing is arranged between the first drive of the differential transmission and the drive machine.

6. The drive train according to claim 1, wherein the gears of the output gear system and/or the adjusting gear system in each case form single-stage or multi-stage gear systems.

7. The drive train according to claim 1, wherein the gears of the output gear system are accommodated in a modifiable frame that is connected to a gear housing.

8. The drive train according to claim 1, wherein the driven machine is a pump, a compressor, fan, conveyor belt, crusher, or a mill.

9. The drive train of claim 1, wherein each of the first gears of the adjusting gear system has a driven-machine-side front side that passes through a respective said plane "A", a distance from each said plane "A" to the drive machine being greater than a distance from the plane "B" to the drive machine.

10. The drive train of claim 2, wherein the additional gears are herringbone-cut gears.

11. The drive train of claim 3, wherein the length of the shaft is at least 200 mm×square root of the differential system-nominal power in MW.

12. The drive train of claim 5, wherein the roller bearing is a two-row tapered roller bearing or a spherical roller bearing.

13. The drive train according to claim 2, wherein a roller bearing is arranged between the first drive of the differential transmission and the drive machine.

14. The drive train according to claim 3, wherein a roller bearing is arranged between the first drive of the differential transmission and the drive machine.

15. The drive train according to claim 4, wherein a roller bearing is arranged between the first drive of the differential transmission and the drive machine.

* * * * *